(12) United States Patent
Wada et al.

(10) Patent No.: US 8,184,522 B2
(45) Date of Patent: *May 22, 2012

(54) OPTICAL HEAD FOR OPTICAL RECORDER/REPRODUCER

(75) Inventors: Hidenori Wada, Kyoto (JP); Sadao Mizuno, Osaka (JP); Yoshiaki Komma, Osaka (JP); Keiichi Matsuzaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,427

(22) Filed: Jan. 3, 2011

(65) Prior Publication Data

US 2011/0096645 A1    Apr. 28, 2011

Related U.S. Application Data

(62) Division of application No. 11/597,996, filed as application No. PCT/JP2005/009946 on May 31, 2005, now Pat. No. 7,889,622.

(30) Foreign Application Priority Data

Jun. 3, 2004    (JP) .................................. 2004-165267

(51) Int. Cl.
G11B 7/00 (2006.01)
(52) U.S. Cl. ............................... 369/112.28; 369/112.21
(58) Field of Classification Search .................... 369/94, 369/44.23, 112.01, 112.02, 112.16–112.19, 369/112.28, 112.21
See application file for complete search history.

(56) References Cited

U.S. PATENT DOCUMENTS

| 4,627,688 | A |   | 12/1986 | Kobayashi et al. |
| 5,751,682 | A |   | 5/1998 | Hasegawa |
| 6,167,019 | A | * | 12/2000 | Tsuchiya et al. ......... 369/112.02 |
| 6,366,542 | B1 |   | 4/2002 | Kojima et al. |
| 6,411,587 | B1 |   | 6/2002 | Arai et al. |
| 6,552,990 | B1 | * | 4/2003 | Kajiyama et al. ............... 369/94 |

(Continued)

FOREIGN PATENT DOCUMENTS

EP        0 601 862        6/1994

(Continued)

OTHER PUBLICATIONS

International Search Report issued Aug. 2, 2005 in International (PCT) Application No. PCT/JP2005/00946 of which parent U.S. Appl. No. 11/597,996 if the U.S. National Stage.

*Primary Examiner* — Thang Tran
(74) *Attorney, Agent, or Firm* — Wenderoth, Lind & Ponack LLP

(57) ABSTRACT

An optical head for recording or reproducing a signal on or from an optical recording medium including a light source, an objective lens for condensing light emitted from the light source to the optical recording medium, and a light-separating device arranged between the light source and the objective lens in order to separate the light reflected from the optical recording medium from the light emitted from the light source. The light-separating device includes a first glass, a multilayer film formed on the first glass, and an adhesive layer arranged on the multilayer film in order to bond a second glass onto the multilayer film. The majority of the light emitted from the light source enters into the light-separating device through the first glass and is reflected by the multilayer film.

7 Claims, 11 Drawing Sheets

U.S. PATENT DOCUMENTS

| | | |
|---|---|---|
| 6,721,259 B1 | 4/2004 | Yamamoto et al. |
| 6,829,090 B2 | 12/2004 | Katsumata et al. |
| 6,870,805 B1 | 3/2005 | Arai et al. |
| 7,586,826 B2 * | 9/2009 | Park et al. ............... 369/112.08 |
| 2002/0089904 A1 | 7/2002 | Takeshita |
| 2003/0012093 A1 * | 1/2003 | Tada et al. ...................... 369/94 |
| 2003/0099179 A1 | 5/2003 | Furuhata et al. |
| 2004/0184388 A1 * | 9/2004 | Ito et al. ...................... 369/124.1 |
| 2005/0174920 A1 * | 8/2005 | Ito et al. .......................... 369/94 |

FOREIGN PATENT DOCUMENTS

| | | |
|---|---|---|
| JP | 63-127444 | 5/1988 |
| JP | 6-231506 | 8/1994 |
| JP | 8-278407 | 10/1996 |
| JP | 9-245369 | 9/1997 |
| JP | 10-112055 | 4/1998 |
| JP | 10-143904 | 5/1998 |
| JP | 11-110773 | 4/1999 |
| JP | 2000-131603 | 5/2000 |
| JP | 2001-110082 | 4/2001 |
| JP | 2002-92925 | 3/2002 |
| JP | 2002-170256 | 6/2002 |
| JP | 2003-187486 | 7/2003 |
| JP | 2003-331459 | 11/2003 |
| JP | 2004-6005 | 1/2004 |
| JP | 2004-103087 | 4/2004 |

* cited by examiner

INCIDENT LASER LIGHT

OPTICAL HEAD FOR OPTICAL RECORDER/REPRODUCER

This application is a divisional of application Ser. No. 11/597,996 filed Jan. 23, 2007 now U.S. Pat. No. 7,889,622, which is the National Stage of International Application No. PCT/JP2005/009946, filed May 31, 2005.

BACKGROUND OF THE INVENTION

1. Technical Field

The present invention relates to an optical head for optical information processing, optical communication and the like. More specifically, the present invention relates to an optical head for an optical recorder/reproducer.

2. Description of the Related Art

Recently, a Digital Versatile Disc (DVD) has attracted attention as a large-capacity optical recording medium, which records digital information with a record density six times denser than that of a compact disc (CD). However, as the amount of information to be stored increases, there has arisen a demand for an even higher density optical recording medium. To achieve a density which is higher than that of DVD (wave length of 660 nm and numerical aperture (NA) of 0.6), it is necessary to shorten a wave length of a light from a light source or to enlarge an NA of an objective lens. When a blue laser of 405 nm wavelength is used as a light source and an objective lens of 0.85 NA is used, for example, it is possible to achieve a record density of digital information recorded on an optical recording medium that is five times denser than that of DVD.

JP-A-2000-131603 discloses an optical head which may be used with a blue laser light source to reproduce and record digital information.

Below, the conventional optical head mentioned above is described with reference to the attached drawings.

FIG. 12 is a schematic diagram of the conventional optical head wherein: 91 refers to a polarization beam splitter; 92 refers to a quarter wave plate; 93 refers to a spherical aberration correcting optical device; 94 refers to an objective lens; 95 refers to an optical recording medium; 96 refers to a focusing lens; 97 refers to a multilens; and 98 refers to a photodetector.

Incident light may be, for example, blue light having a wavelength less than or equal to 450 nm which is output from a gallium nitride series laser and collimated. The polarization beam splitter 91 is an optical device which shows different transmittance and reflectance according to a polarization direction of incident light. The polarization beam splitter is used to split the light. The quarter wave plate 92 is an optical device made of a birefringent material. The quarter wave plate 92 is used to convert linearly-polarized light to circularly-polarized light. The spherical aberration correcting optical device 93 is an optical device for correcting a spherical aberration developed by a deviation of a thickness of a substrate of the optical recording medium 95 from a predetermined optimal substrate thickness. The spherical aberration correcting optical device 93 includes a concave lens, a convex lens, and a uniaxial actuator (not shown), and can correct the spherical aberration by changing the distance between the concave lens and the convex lens. The objective lens 94 condenses light onto a recording layer of the optical recording medium and is configured with two groups two lenses composition. The focusing lens 96 condenses the light which is reflected on the recording layer of the optical recording medium onto the photodetector 98. The multilens 97 has a cylindrical plane as an incidence plane and a plane which is rotationally symmetric with respect to the optical axis of the multilens as an emittance plane and provides the incident light with astigmatism, which enables the detection of a focus error signal by using the so-called astigmatism method. The photodetector 98 receives the light which is reflected by the recording layer of the optical recording medium 95 and converts the light to electrical signals.

Next, operation of the optical head thus configured will be described. Parallel blue light which is emitted from a gallium nitride laser transmits through the polarization beam splitter 91 and enters the quarter wave plate 92. The quarter wave plate 92 converts the linearly-polarized light to circularly-polarized light. Then the light which is transmitted through the quarter wave plate 92 enters the spherical aberration correcting optical device 93. The optical device 93 converts the incident parallel light to divergent light or convergent light by changing the distance between the concave lens and the convex lens, both of which are constituting the spherical aberration correcting optical device 93, so as to correct for spherical aberration that occurs when a thickness of the substrate of the optical recording medium 95 deviates from its optimal substrate thickness. This converted light enters the objective lens 94 and is imparted with a spherical aberration on some level according to a degree of divergence or convergence of the incident light. And then, the converted light is focused on the optical recording medium 95. Thus, the light which is prospectively imparted with a wavefront aberration enters objective lens 94 to be condensed so that a wavefront aberration due to a deviation of the substrate thickness from the optimal substrate thickness may be corrected. Therefore, a spot of the light which has no aberration is formed on the optical recording medium 95, that is, the light is focused to a diffraction limit on the medium 95. The circularly-polarized light subsequently reflected on the optical recording medium 95 enters the quarter wave plate 92 through the spherical aberration correcting optical device 93. The quarter wave plate 92 converts the reflected light to linearly-polarized light of which polarization direction is perpendicular to the polarization direction of the laser light propagating toward the optical recording medium 95. The linearly-polarized light, which is converted by the quarter wave plate 92, reflects on the polarization beam splitter 91 and enters the focusing lens 96. This light is focused by the focusing lens 96, imparted astigmatism by the multilens 97, and condensed on the photodetector 98. The photodetector 98 outputs a focus error signal which indicates a condition of focusing of the light on the optical recording medium 95 and a tracking error signal which indicates the irradiation position of the light on the optical recording medium 95. Then the focus error signal and the tracking error signal are detected by means of well-known methods such as the astigmatism method and the three beams method. A focus controller (not shown) controls the position of the objective lens 94 along its optical axis according to the focus error signal so that the light condensed may constantly be focused on the optical recording medium 95. A tracking controller (not shown) also controls the position of the objective lens 94 according to the tracking error signal so that the light may be condensed on the desired track of the optical recording medium 95. In addition, the photodetector outputs information recorded on the optical recording medium 95. Thus configured, the spherical aberration due to the deviation of the substrate thickness of the optical recording medium 95 from the optimal substrate thickness can be corrected using the spherical aberration correcting optical device 93.

The optical head thus configured can be used to reproduce and record digital information even when light of less than or equal to 450 nm wavelength is used as a light source.

SUMMARY OF THE INVENTION

Problem to be Solved by the Invention

In the optical head mentioned above, however, laser light, which has been emitted from the light source and converted to parallel light, heads toward the optical recording medium 95 and is transmitted through the polarization beam splitter 91 on the approaching portion of its light path. That is to say, blue light with large luminous energy for recording/reproducing information transmits through the polarization beam splitter 91. This makes a adhesive layer of the polarization beam splitter 91 receive blue light with a large amount of luminous energy, and hence the adhesive layer is gradually deteriorated by light and a transmittance or an aberration of the polarization beam splitter is degraded, and as a consequence of the deterioration and the degradation, the recording characteristics and reproducing characteristics of the optical head are degraded. In fact, a transmittance of an adhesive layer including a certain adhesive material is degraded by three percent by irradiating light of 19 ($mW/mm^2$) light energy density for about a hundred hours.

In view of the foregoing problem, it is an object of the present invention to provide a highly reliable optical head, which includes a prism (a polarization beam splitter) having an adhesive layer that may be deteriorated by light from a light source but avoids the light deterioration of the prism over time due to such deterioration by the light from the light source.

In the description, the light path of laser light heading toward the optical recording medium 95 from the light source is referred to as an approaching way, and the light path of laser light after reflection on the optical recording medium 95 is referred to as a returning way.

Means for Solving the Problem

In one aspect of the present invention, the present invention accomplishes the object stated above by providing an optical head for recording and/or reproducing a signal on an optical recording medium which includes: a light source; an objective lens which condenses light emitted from the light source onto the optical recording medium; and a light separator which is disposed between the light source and the objective lens on a light path of the emitted light and separates the emitted light from reflected light which is emitted from the light source and reflected by the optical recording medium, wherein the light separator has: a first glass; a multilayer film which is formed on the first glass; and a second glass which is fixed on the multilayer film.

In one aspect of the present invention, the second glass is desirably bonded to the multilayer film by an adhesive layer which is arranged on the multilayer film. More desirably, the light separator receives the emitted light from the first glass. This makes the light that is emitted from the light source to not be transmitted through the adhesive layer. Hence, the adhesive layer is not deteriorated by blue light and the optical head shows high reliability. In addition, this leads to a reduction of manufacturing costs since a specialized adhesive material, which is not deteriorated by the blue light, is not needed.

In one aspect of the present invention, the second glass may be tightly appressed against the multilayer film. This increases the reliability of the optical head since no adhesive layer exists which shows deterioration due to the blue light.

In one aspect of the present invention, the optical head may further include an n/4 wave plate where n is an odd number greater than or equal to 1 which is disposed between the light source and the objective lens on the light path of the emitted light and converts a polarization direction of the emitted light. The n/4 wave plate may have a first birefringent member and a second birefringent member; the first birefringent member and the second birefringent member may be arranged such that crystal axes of the first and second birefringent members are seen from the viewpoint right above the members as if the axes cross each other at a right angle; and the first birefringent member and the second birefringent member are bonded at least a part of margin of the first birefringent member and the second birefringent member. This causes the light emitted from the light source to not be transmitted through the adhesive layer which bonds ¼ wave plates together. Hence, the adhesive layer is not deteriorated by irradiation of blue light and the optical head shows high reliability. In addition, this leads to a reduction in manufacturing costs since a specialized adhesive material which is not deteriorated by the blue light is not needed.

In one aspect of the present invention, the optical head may desirably include a spherical aberration corrector which is disposed between the light source and the objective lens on the light path of the emitted light. This enables steady recording or reproducing to or from the optical recording medium even when the thickness of the optical recording medium deviates from a designed substrate thickness.

In one aspect of the present invention, the optical head may desirably include a connector which integrates the light source and the light separator. This makes it easy to align the light separator with respect to the light source.

In one aspect of the present invention, the light source may desirably emit light of less than or equal to 450 nm wavelength. This enables a high density information recording or reproducing.

In one aspect of the present invention, the multilayer film may desirably be formed on the first glass by vapor deposition.

In one aspect of the present invention, the optical head may desirably include an optical device which is disposed between the light source and the objective lens on the light path of the emitted light and converts divergent light to approximate parallel light. The light separator may be disposed between the light source and the optical device. This allows the optical head to be downsized.

In another aspect of the present invention, the present invention provides an optical head for recording and/or reproducing a signal on an optical recording medium which includes: a light source; an objective lens which condenses light emitted from the light source onto the optical recording medium; and an n/4 wave plate where the n is an odd number greater than or equal to 1 which is disposed between the light source and the objective lens on the light path of the emitted light and converts a polarization direction of the emitted light. The n/4 wave plate may have a first birefringent member and a second birefringent member. The first birefringent member and the second birefringent member may be arranged such that crystal axes of the first and second birefringent members are seen from the viewpoint right above the members as if the axes cross each other at a right angle. The first birefringent member and the second birefringent member are bonded at least a part of a margin of the first birefringent member and the second birefringent member.

In a further aspect of the present invention, the present invention provides an optical recording/reproducing apparatus which records or reproduces a signal to or from an optical recording medium which includes the optical head according to the one aspect of the present invention which records or reproduces a signal on the optical recording medium. Since a part mounted in the apparatus is not deteriorated by light emitted from a light source, this apparatus of the present invention provides an optical recording/reproducing apparatus of high reliability.

EFFECT OF THE INVENTION

The optical head of the present invention may be configured so that the light does not transmit through an adhesive layer of a polarization beam splitter which functions as a light separator on its approaching way so that the adhesive layer is not deteriorated by light even when a laser light source is used. Therefore, an optical head that can reliably be used for high density information recording is achieved. Furthermore, even when luminous energy from the light source is further increased for recording on a multi-layer optical recording medium or speeding up the recording, the configuration of the optical head of the present invention achieves high reliability.

A further effect of the present invention is that the light separator can be arranged in a divergent light where the energy density of the light may locally be higher. Therefore, the present invention achieves a reliable optical head which is also suitable for downsizing.

In addition, a reliable optical recording/reproducing apparatus can be achieved using this optical head.

Figure 1:
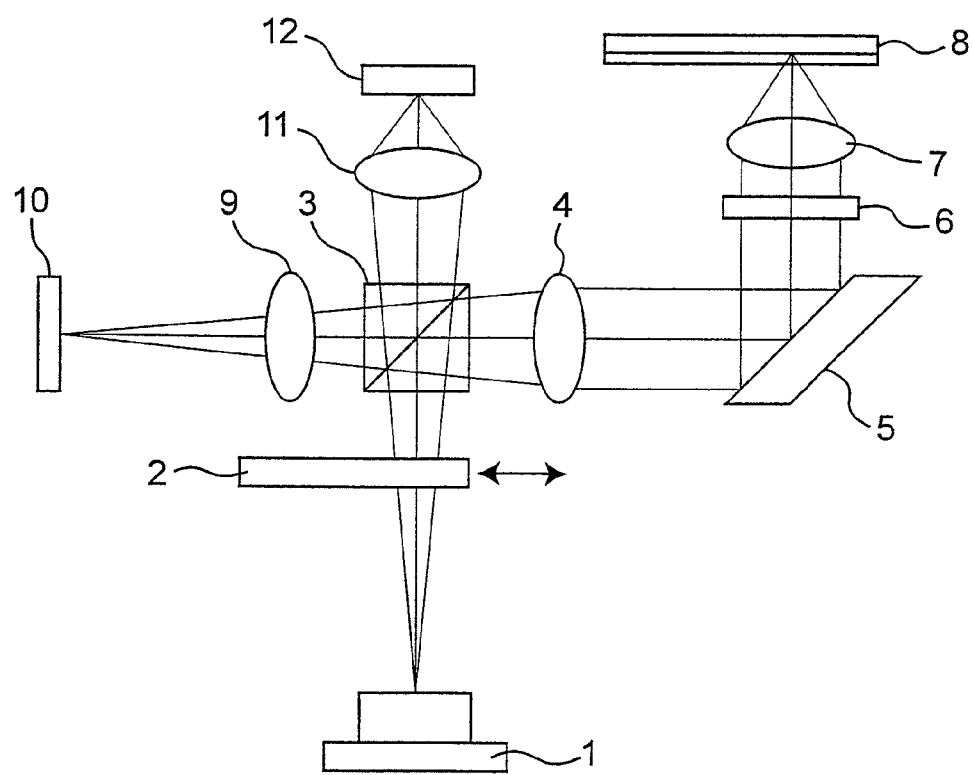
FIG. 1 is a schematic diagram of a example of a optical head according to the present invention.

EXPLANATIONS OF REFERENCE LETTERS OR NUMERALS 1 light source
2 luminous energy attenuating element
3 polarization beam splitter
4 collimator lens
5 mirror
6 quarter wave plate
7 objective lens
8 optical recording medium
9 cylindrical lens
10 photodetector
11 light condensing lens
12 photodetector for controlling a light source luminous energy
21 first glass
22 multilayer film
23 adhesive layer
24 second glass
31 mounting member for connection
41 first birefringent member
42 second birefringent member
43 adhesive layer
51 polarization hologram
52 first photodetector
53 second photodetector
61 first substrate
62 second substrate
63 voltage applying electrode
64 opposing electrode
65 translucent resin film
66 translucent resin film
67 liquid crystal
68 sealing resin
81 optical head
82 motor
83 processing circuit
84 luminous energy monitoring unit
85 signal processing unit
86 luminous energy controlling unit
87 objective lens driving unit

DETAILED DESCRIPTION OF THE INVENTION

With reference to the accompanying drawings, embodiments of the present invention are described hereinafter.

First Embodiment

An optical head according to the first embodiment of the present invention is described.

FIG. 1 is a configuration diagram of an optical head according to the first embodiment.

In FIG. 1, the optical head of the present invention includes: a light source 1; a luminous energy attenuating element 2; a polarization beam splitter 3, collimator lens 4; a mirror 5; a quarter wave plate 6; an objective lens 7; a cylindrical lens 9; a photodetector 10; a light condensing lens 11; and a photodetector for controlling a light source luminous energy 12. The collimator lens 4 and a uniaxial actuator (not shown) constitute a spherical aberration corrector. In addition, the polarization beam splitter 3 constitutes a light separator. The majority of the laser light emitted from the light source 1 falls and reflects on the polarization beam splitter 3 through the luminous energy attenuating element 2; transmits through the collimator lens 4; reflects on the mirror 5; transmits through the quarter wave plate 6 and the objective lens 7; and enters the optical recording medium 8. The light path described above may be referred to as an approaching way. A part of the laser light entered into the optical recording medium 8 reflects off and enters the polarization beam splitter 3 following backward the same path as the approaching way. Unlike the approaching way, the light entering the polarization beam splitter 3 transmits through the polarization beam splitter 3 and the cylindrical lens 9 and enters the detector 10.

This light path from the optical recording medium 8 to the detector 10 may be referred to as a returning way. In addition, as to the approaching way, the polarization beam splitter 3 is configured so that a proportion of the luminous energy of light, which is emitted from the light source and transmits through the polarization beam splitter 3 to the total luminous energy, should be in a range from several percent to 10 percent. This light goes straight toward the upper side of the figure and transmits through the light condensing lens 11 and enters the detector for controlling a light source luminous energy 12. It is possible to control the luminous energy of the light source 1 based on the luminous energy which falls on the photodetector for controlling a light source luminous energy 12. It is to be noted that the light condensing lens 11 and photodetector for controlling a light source luminous energy 12 are not essential elements for the present invention. When omitting the photodetector for controlling a light source luminous energy 12, the polarization beam splitter 3 may be configured so that the entire light on its approaching way reflects on the polarization beam splitter 3.

Below, the elements constituting the optical head are described in detail. The light source 1 may include a gallium nitride series semiconductor laser elemental device (405 nm wavelength), which functions as a light source emitting a coherent light to a recording layer of the optical recording medium 8 for recording/reproducing. The luminous energy attenuating element 2 is an optical device for reducing noise of the light source 1 as disclosed in JP-A-2000-195086, which has a film (Cr film, for example) for attenuating the luminous energy formed on a part of its glass substrate and is movable along the direction indicated by an arrow in the figure. The configuration of the polarization beam splitter 3 is described in detail later. The polarization beam splitter 3 has a transmittance of 5 percent and a reflectance of 95 percent for linearly-polarized light (S-polarized light, for example) and has a transmittance of 100 percent for linearly-polarized light which is polarized in a direction perpendicular to that of the above linearly-polarized light (P-polarized light). The collimator lens 4 is an optical device (lens) which converts divergent light emitted from the light source 1 to parallel light. The spherical aberration corrector corrects the spherical aberration that occurs when the substrate thickness of the optical recording medium 8 is different from its optimal substrate thickness, which is made up of the collimator lens 4 and the uniaxial actuator (not shown). It is possible to correct the spherical aberration by changing a position of the collimator lens 4 using the uniaxial actuator. The mirror 5 is an optical device which reflects the light entered therein to head it to a direction toward the optical recording medium 8 and has characteristics wherein the mirror reflects 100 percent of the incident light. The configuration of the quarter wave plate is described in detail later. The quarter wave plate is an optical device which includes birefringent material and converts linearly-polarized light to circularly-polarized light. The objective lens 7 is a lens of 0.85 NA which condenses light onto the recording layer of the optical recording medium 10. The cylindrical lens 9 has a cylindrical plane used as an incidence plane and a rotational symmetry plane with respect to an optical axis of a lens used as an exit plane and used for imparting astigmatism to the incident light so that a focus error signal can be detected by means of so-called astigmatism method. The photodetector 10 receives the light reflected off the recording layer of the optical recording medium 8 and converts the received light to an electrical signal. The light condensing lens 11 condenses the light transmitted through the polarization beam splitter 3 onto the photodetector controlling a light source luminous energy 12. The photodetector for controlling a light source luminous energy 12 receives the light transmitted through the polarization beam splitter 3 and converts the received light to an electrical signal so as to output a signal for detecting the luminous energy of the light source 1.

Next, operations of the optical head thus configured is described. The linearly-polarized light emitted from the light source 1 transmits through the luminous energy attenuating element 2. And most of the transmitted light reflects on the polarization beam splitter 3 and only a tiny percent of the transmitted light transmits through the polarization beam splitter 3. When letting the luminous energy of the incident light be 100, the luminous energy of the reflected light and the luminous energy of the transmitted light at the polarization beam splitter of the approaching way may be approximately 95 and 5, respectively. Subsequently, the reflected light enters the collimator lens and is converted to divergent light, parallel light, or convergent light according to the position of the collimator lens 4. The light, which has changed its degree of convergence, enters the mirror 5 and 100 percent of the light reflects on the mirror 5 and its traveling direction is changed to a direction toward the optical recording medium 8. The reflected light enters the quarter wave plate 6 and is converted from linearly-polarized light to circularly-polarized light. The circularly-polarized light enters the objective lens 7. According to the degree of divergence or convergence of the circularly-polarized light, which enters the objective lens 7, the circularly-polarized light is imparted with a spherical aberration and condensed in the optical recording medium 8. At this time, the wavefront aberration that has occurred when the substrate thickness, that is, the thickness from the surface to the recording layer of the optical recording medium 8 deviates from its optimal substrate thickness is balanced out by the wavefront aberration imparted by the objective lens 7 according to the degree of the divergence or convergence. The light spot, which is focused to its diffraction limit, is formed on the recording layer of the optical recording medium 8 without any aberrations. Next, the circularly-polarized light which has reflected off the optical recording medium 8, that is, the light on its returning way transmits through the objective lens 7; enters the quarter wave plate 6; and is converted to the linearly-polarized light which has its polarization plane perpendicular to that of the linearly-polarized light emitted from the light source 1. The linearly-polarized light converted by the quarter wave plate 6 entirely reflects on the mirror 5; transmits through the collimator lens 4; entirely transmits through the polarization beam splitter 3, namely, never returns to the light source 1; enters the cylindrical lens 9 and is imparted astigmatism by the cylindrical lens 9; and is condensed onto the photodetector 10. The photodetector 10 outputs a focus error signal which indicates a condition of focusing of the light on the recording layer of the optical recording medium 8 and a tracking error signal which indicates the irradiation position of the light. The focus error signal and the tracking error signal are detected by means of the well-known methods such as the astigmatism method and the push-pull method. A focus controller (not shown) controls the position of the objective lens 7 along a direction of its optical axis according to the focus error signal such that the light may constantly be condensed in a condition that the light is focused on the optical recording medium 8. A tracking controller (not shown) controls the position of the objective lens 7 according to the tracking error signal such that the light is focused at a desired track of the optical recording medium 8. The information recorded in the optical recording medium 8 is also provided from the photodetector 10. Furthermore, on the approaching way of the light, the light which has emitted from the light source 7 and transmitted through the polarization beam splitter 3 is condensed onto the photodetector for controlling the light source luminous energy 12 and the detector 12 outputs electrical signals related to the luminous energy emitted from the light source 1.

Figure 2:
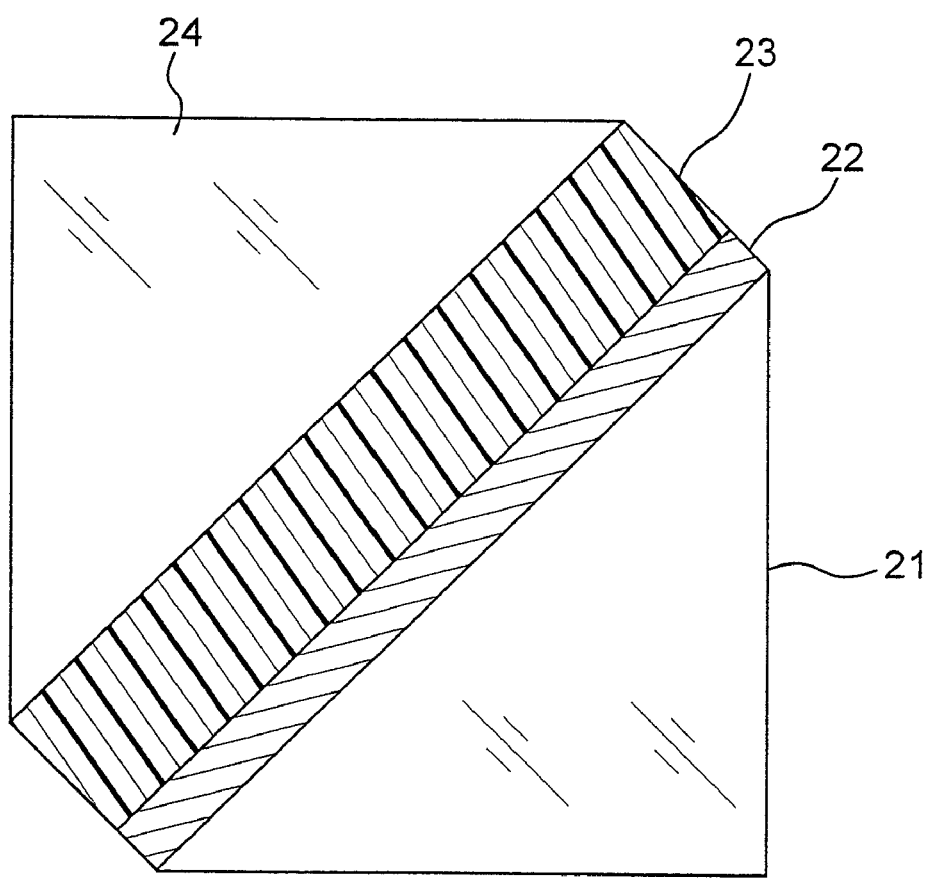
FIG. 2 is a configuration diagram of a polarization beam splitter included in the optical head according to the present invention.

Next, the polarization beam splitter 3 is described in detail. FIG. 2 is a configuration diagram of the polarization beam splitter 3. Referring to FIG. 2, the polarization beam splitter 3 includes a first glass 21, a multilayer film 22, an adhesive layer 23, and a second glass 24. The first glass 21 and the second glass 24 may contain glass material such as BK7. The multilayer 22 may include approximately 20 layers, which is configured by alternately stacking a thin film of silicon dioxide and a thin film of tantalum pentoxide. The multilayer 22 may be formed on the first glass 21 with vapor deposition. The adhesive layer 23 may be ultraviolet (UV) curable resin, for example. Since the adhesive layer 23 includes resin, the adhesive layer 23 may absorb short-wavelength light. In fact, the adhesive layer 23 may absorb light having wavelength of blue (wavelength shorter than or equal to 450 nm). The amount of the absorption may be extremely small, but the adhesive layer 23 may deteriorate due to this absorption characteristic. On the approaching way of the light, the thus configured polarization beam splitter 3 receives the light from the first glass side. Configuring the polarization beam splitter 3 as described, the majority of the light, on the approaching way, reflects on the multilayer film 22 without transmitting through the adhesive layer 23. As described above, the adhesive layer 23 deteriorates due to the incidence of blue light gradually but in small degree. The larger the luminous energy (light energy density at the adhesive layer) enters, the more rapidly the adhesive layer 23 deteriorates. It is to be noted that the light in its approaching way must have a rather large amount of luminous energy to record information on the optical recording medium 8. On the other hand, since the reflectance of the optical recording medium 8 is small, the luminous energy of the light, which has reflected off the optical recording medium 8, becomes very small. Hence the luminous energy of the light, which enters the polarization beam splitter 8, becomes very small from the luminous energy of the light on the approaching way. Assuming that the reflectance of the optical recording medium 8 is approximately 5 to 10 percent, the luminous energy of the light on the returning way may be approximately one twentieth to one tenth in comparison with the luminous energy of the light on the approaching way. Therefore, configuring the optical head such that the light on its approaching way should not transmit through the adhesive layer 23 and only the light on its returning way can transmit through the adhesive layer 23, a reliable optical head of which adhesive layer 23 does not deteriorate can be achieved. As in the present embodiment, the dimension of the polarization beam splitter 3 can be reduced by disposing the polarization beam splitter 3 in the divergent light and lessening the size of the light which enters the polarization beam splitter 3. It is advantageous for the downsizing of the optical head. In this case, since the energy density of the light that enters the polarization beam splitter 3 gets especially high, the configuration of the optical head, as described wherein the light on its approaching way does not transmits through the adhesive layer 23, can improve the reliability of the optical head. When letting the energy density of the light, which enters the polarization beam splitter which is disposed in parallel light be 100, the energy density of the light which enters the polarization beam splitter which is disposed at the midpoint of the light path between the light source and the optical device (collimator lens, for example), which converts the light to parallel light, may receive the light of which energy density reaches up to 400 locally. (A light energy density is inversely proportional to the square of a distance from a light source.) Therefore, the present invention can provide a reliable and downsized optical head without using specialized adhesive material. In addition, the configuration of the present invention is advantageous for recording/reproducing a multilayer optical recording medium which includes a plurality of recording layers in it. When the multilayer optical recording medium which includes recording layers is used to record information, it is necessary to record information to each of the recording layers. Hence the luminous energy of the light emitted from the light source 1 in this situation gets higher than that emitted in a situation where the information is recorded to a recording layer of a single layer optical recording medium. An amount of light which enters the polarization beam splitter 3 increases in the situation where the multilayer optical recording medium is used. Thus, the present invention can provide a reliable optical head configuration for use in such a situation. Similarly, it is necessary to increase the luminous energy of the light irradiating the optical recording medium 8. Hence, in such a case, the luminous energy of the light emitted from the light source 1 has to be increased. The present invention also can provide a reliable optical head configuration for use in such a case.

Figure 3:
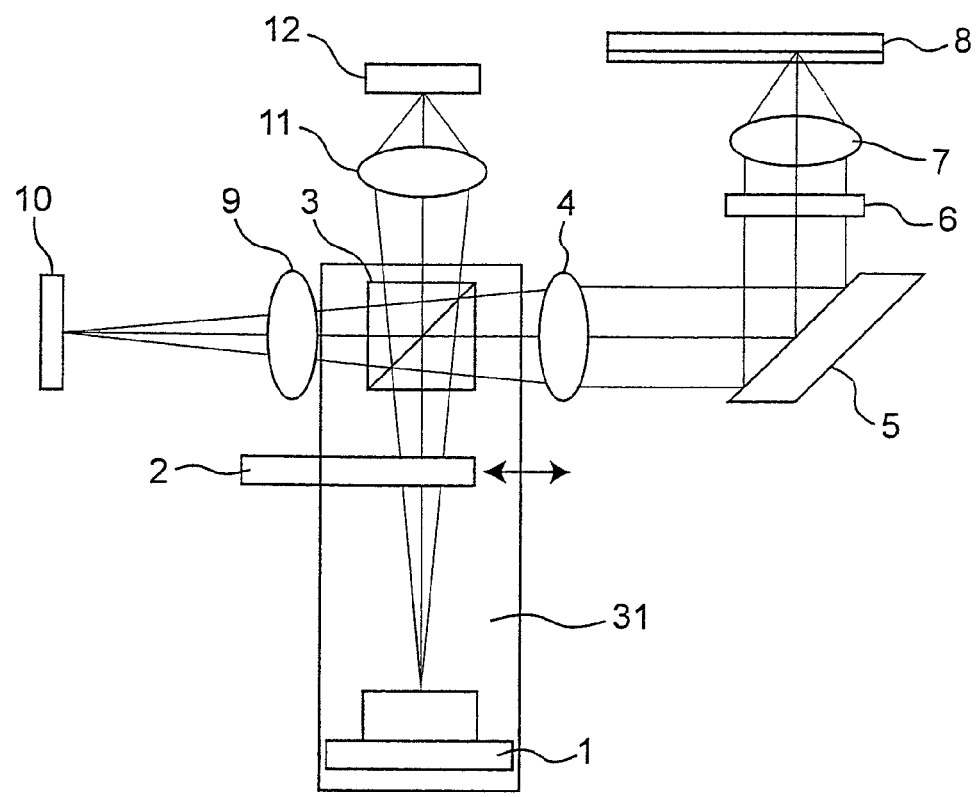
FIG. 3 is a schematic diagram of another example of the optical head according to the present invention.

As shown in FIG. 3, the light source 1 and the polarization beam splitter 3 may be integrated by using a mounting member for connection 31. By means of the mounting member for connection 31, which functions as a connector between the light source 1 and the polarization beam splitter 3, the light source 1 and the polarization beam splitter 3 can be handled as one integrated unit. By configuring the optical head as described, it is effective in avoiding misalignment of the polarization beam splitter 3 with respect to the optical axis of the light source 3 in the optical head manufacturing process so that facilitates the manufacturing process and works to reduce the cost of manufacturing.

Figure 4:
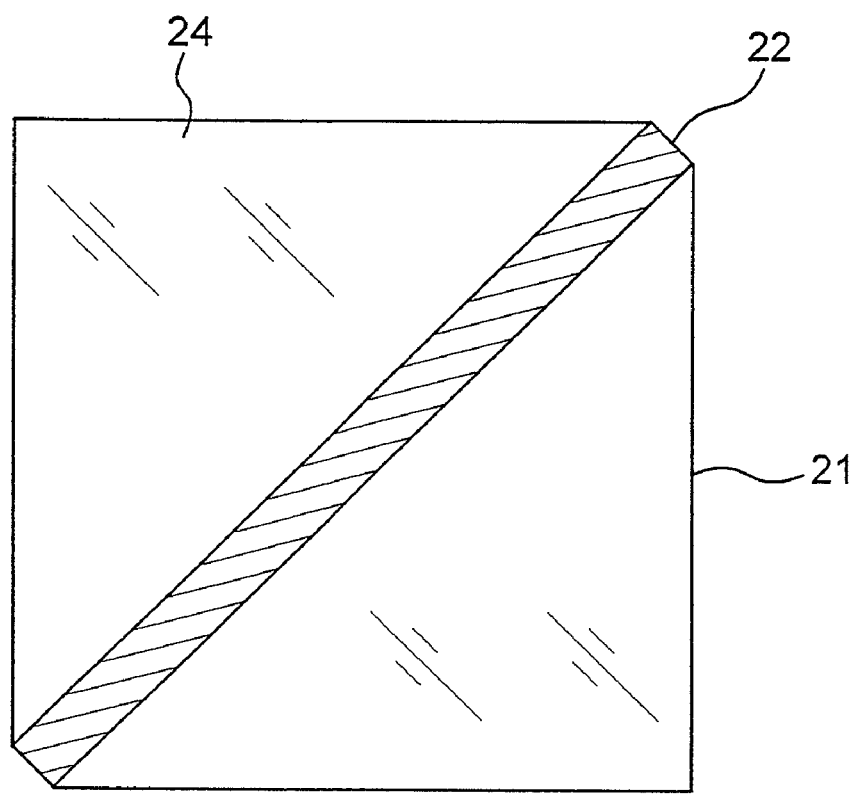
FIG. 4 is a configuration diagram of another example of the polarization beam splitter included in the optical head according to the present invention.

Furthermore, as shown in FIG. 4, by configuring the polarization beam splitter 3 such that the second glass 24 is tightly appressed against (optically contacted with) the multilayer film 22, there is no need to consider the deterioration of the adhesive material. Therefore, an optical head of high reliability can be achieved. In addition the optical head thus configured can be arranged such that the light on its approaching way may reflect on or transmit through the polarization beam splitter 3.

Figure 5:
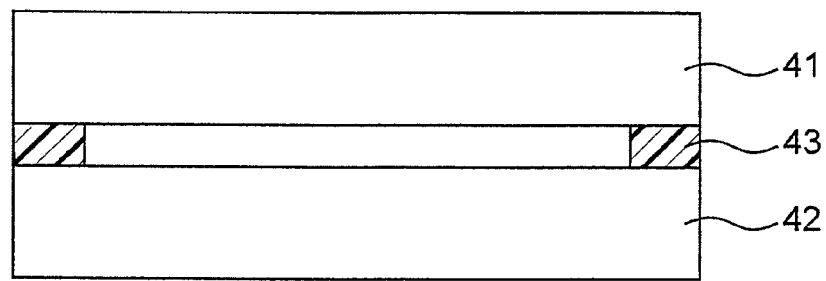
FIG. 5 is a configuration diagram of a quarter wave plate included in the optical head according to the present invention.
Figure 6:
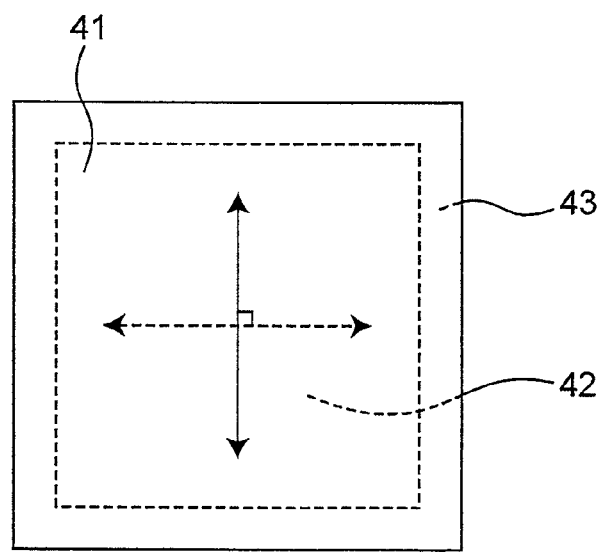
FIG. 6 is a plan view of the quarter wave plate, which indicates two crystal orientations of birefringent members.
Figure 7A:
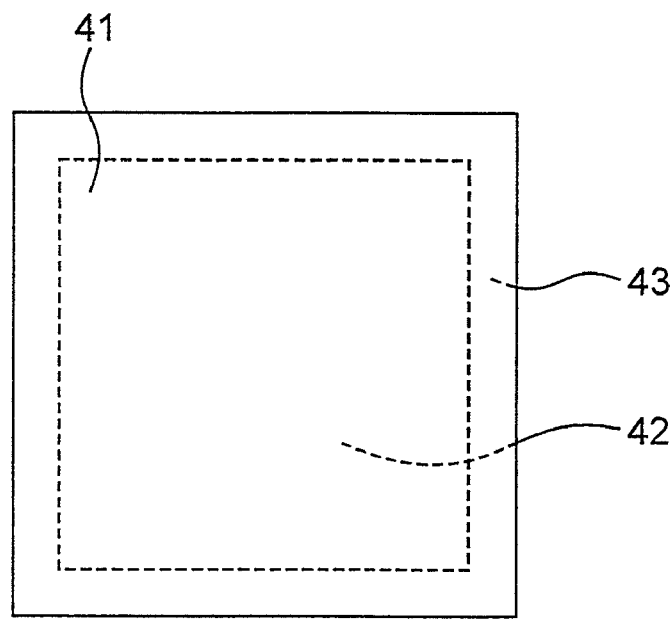
FIGS. 7A and 7B are sectional views showing arrangements of adhesive layers of the quarter wave plates.
Figure 7B:
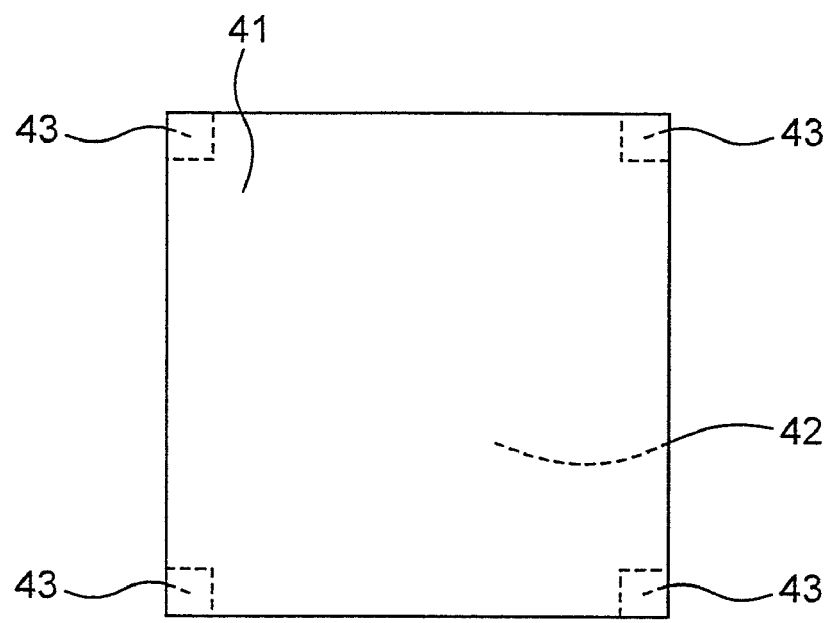

The quarter wave plate 6 used in the optical head of the present invention is described next. FIG. 5 is a configuration diagram of the quarter wave plate 6 used in the optical head of the present invention. Referring to FIG. 5, the quarter wave plate 6 includes a first birefringent member 41, a second birefringent member 42, and adhesive layer 43. The first and second birefringent members 41 and 42 may include crystals. The region which is in between the first and second birefringent members 41 and 42 and sandwiched by the adhesive layers 43 may be a gap (a layer of air). FIG. 6 is a top plan view of the quarter wave plate 6. As shown in FIG. 6, the first and second birefringent members are arranged such that the crystal axes may be seen from the viewpoint right above the members as if they cross each other at a right angle. FIGS. 7A and 7B illustrates arrangement patterns of the adhesive layer 43. As shown in FIG. 7A, the adhesive layer 43 may be disposed at the margin of the member 41 or 42 in the shape of a girdle with constant width. Alternatively, as shown in FIG. 7B, the separate adhesive layers 43 may be disposed at the corners of the member 41 or 42. The adhesive layer 43 may include UV curable resin, for example, and be disposed outside the effective diameter where no light transmits. By configuring the quarter wave plate 6 as described, an angular dependency of retardation can be reduced. It is effective especially when the quarter wave plate is used in the optical head which corrects spherical aberration by changing the degree of divergence or convergence of the light entering the objective lens 7. Furthermore, since the adhesive layer 43, which blue light may deteriorate, is disposed at the portion where no light transmits, the adhesive layer 43 is not deteriorated by the blue light. The reliable quarter wave plate 6 which has a good incident angular dependency can be achieved, and a reliable high performance optical head is achieved. Yet furthermore, the quarter wave plate 6, which includes only one piece of crystal, can be used by raising the precision of the placement of the quarter wave plate 6 to the optical head. The reliable optical head can be achieved since there exists no adhesive layer.

As stated, the optical head of the present invention in which a light source of less than or equal to 450 nm wavelength is used may be configured such that the light on its approaching way from the light source may not transmit through the adhesive layer of the polarization beam splitter which functions as a light separator. This avoids the irradiation of strong light to the adhesive layer. Since the adhesive layer does not deteriorate, a reliable optical head, which can be used in a high density recording, can be achieved. In addition, since it is possible for the light separator to be disposed in divergent light where an acceleration of the deterioration of the adhesive layer may arise for the sake of localized increase of the energy density of light, reliable and downsized optical head can be achieved. Furthermore, the present invention can provide a reliable optical head even when the optical head is used with light with higher luminous energy from the light source to speed up the recording speed or to use a multilayer optical recording medium.

Second Embodiment

With reference to the drawings, the second embodiment of the present invention is described next. The difference between the present embodiment and the first embodiment is the provision of a light separator that includes polarization hologram and a photodetector, which receives light diffracted by the polarization hologram. Except for the points just described, the second embodiment is the same as the first embodiment. It may be considered that the present embodiment is the same as the first embodiment unless a specific explanation is described. A component having the same reference numeral as that of the first embodiment may have a similar functionality as that of the first embodiment unless stated.

Figure 8:
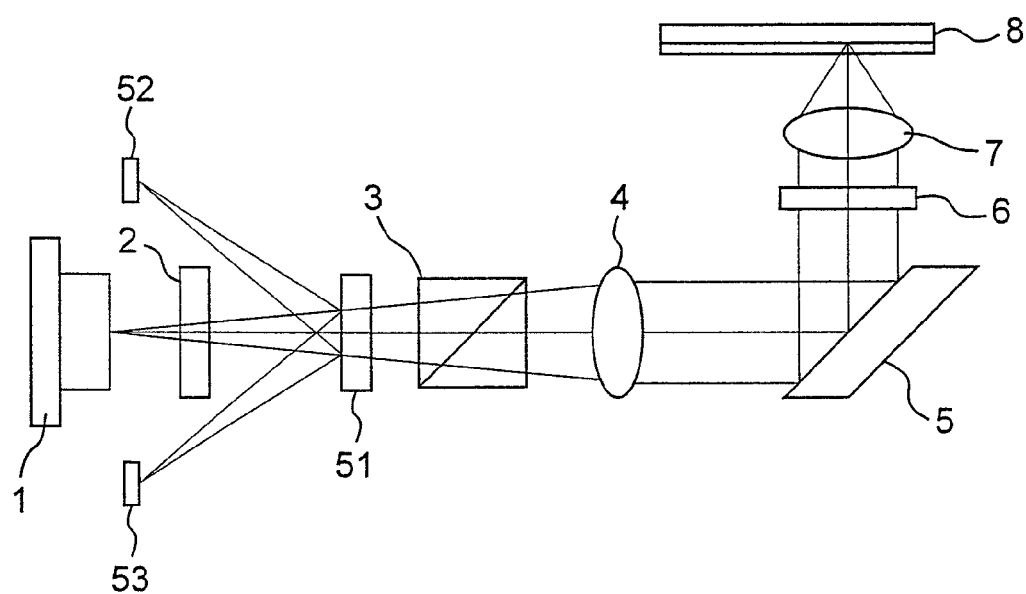
FIG. 8 is a schematic diagram of a further example of the optical head according to the present invention.

FIG. 8 is a configuration diagram of an optical head according to the second embodiment. Referring to FIG. 8, the optical head includes a polarization hologram 51, a first photodetector 52, and a second photodetector 53. The polarization hologram 51 includes an etched proton exchanged portion which is formed by proton exchanging a predetermined portion of a lithium niobate substrate which shows a birefringence. The polarization hologram 51 is an optical device which functions as a diffraction grating for an ordinary ray and indicates 100% transmittance to an extraordinary ray. Further detailed description of the polarization hologram 51 is abbreviated since a detailed explanation for the polarization hologram is described in JP-A-H06-27322. In the present optical head, the polarization hologram 51 constitutes a light separator.

The operations of the optical head thus configured is described. Linearly-polarized light emitted from a light source 1 transmits through a luminous energy attenuating element 2. And then the polarization hologram 51 transmits a 100% of the light. This transmitted light enters a collimator lens 4 and is converted to divergent light, parallel light, or convergent light according to the positioning of the collimator lens 4. The light that has undergone the conversion of a degree of convergence enters a mirror 5 and the mirror 5 reflects 100% of the incident light and changes a traveling direction of the light to a direction heading for an optical recording medium 8. The reflected light enters a quarter wave plate 6 and is converted to circularly-polarized light from linearly-polarized light. The circularly-polarized light enters an objective lens 7 and is imparted with a spherical aberration according to a degree of divergence or convergence of the light and is condensed onto the optical recording medium 8. The light which is imparted a wavefront aberration that may be balanced out by a wavefront aberration to be imparted when a substrate thickness, that is, the thickness from the surface to the recording layer of the optical recording medium 8 deviates from its optimal substrate thickness is condensed by the objective lens 7. Therefore, a light spot which is focused to its diffraction limit is formed on the recording layer of the optical recording medium 8 without any aberrations. Next, the circularly-polarized light which has reflected off the optical recording medium 8 transmits through the objective lens 7; enters the quarter wave plate 6; and is converted to the linearly-polarized light which has its polarization plane perpendicular to that of the linearly-polarized light emitted from the light source 1. The linearly-polarized light, converted by the quarter wave plate 6, entirely reflects on the mirror 5 and transmits through the collimator lens 4. A 100% of the light is diffracted by the polarization hologram 51. First photodetector 52 receives the diffracted light of +1st order and second photodetector 53 receives the diffracted light of −1st order. The first and second photodetectors 52 and 53 output focus error signals which indicate a condition of focusing of the light on the recording layer of the optical recording medium 8 and tracking error signals which indicate the irradiation position of the light. The focus error signals and the tracking error signals are detected by means of well-known methods such as the SSD method and the push-pull method, for example. A focus controller (not shown) controls the position of the objective lens 7 along a direction of its optical axis according to the focus error signals such that the light may constantly be condensed in a condition that the light is focused on the optical recording medium 8. A tracking controller (not shown) controls the position of the objective lens 7 according to the tracking error signals such that the light is focused at a desired track of the optical recording medium 8. In addition, the information recorded in the optical recording medium 8 is also provided from the first and second photodetectors 52 and 53.

At the same time, since the quarter wave plate is configured as described in the first embodiment (cf. FIG. 5), the quarter wave plate 6 which shows a high reliability is achieved.

As described above, since the quarter wave plate in the optical head using light of less than or equal to 450 nm wavelength includes two birefringent members which are bonded each other such that the crystal axes of those members can be seen from the view point right above the members as if they cross each other at a right angle, and a layer of adhesive material (an adhesive layer) which bonds the members are disposed at a position where no light transmits, the adhesive layer is not deteriorated. Therefore, an optical head, which can perform high density recording with a high degree of reliability, can be achieved with an adhesive material which may cause light aging.

It is to be noted that, however each of the optical heads described in the first and second embodiments includes a spherical aberration corrector, the optical heads do not have to include the spherical aberration corrector.

Figure 9:
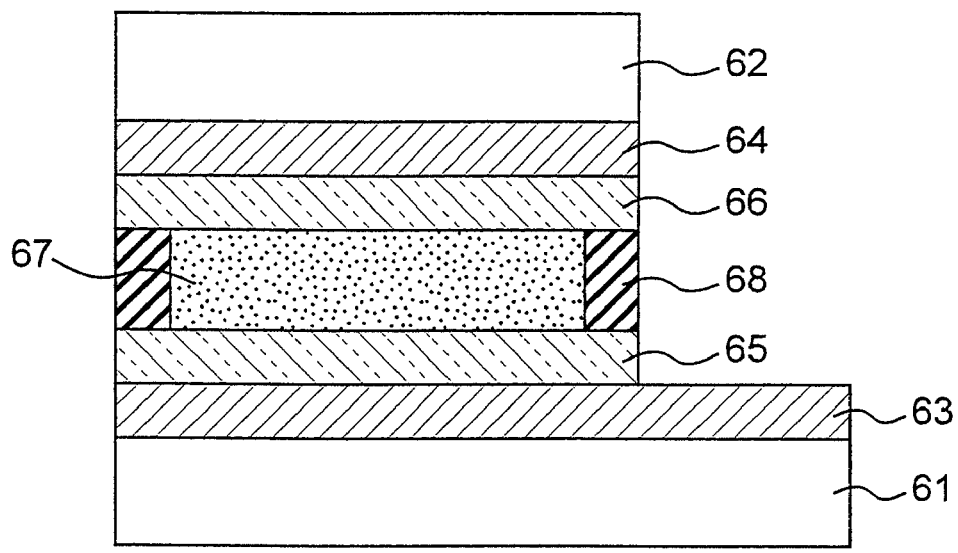
FIG. 9 is a sectional view of an example of a spherical aberration corrector having a phase-changing layer.
Figure 10:
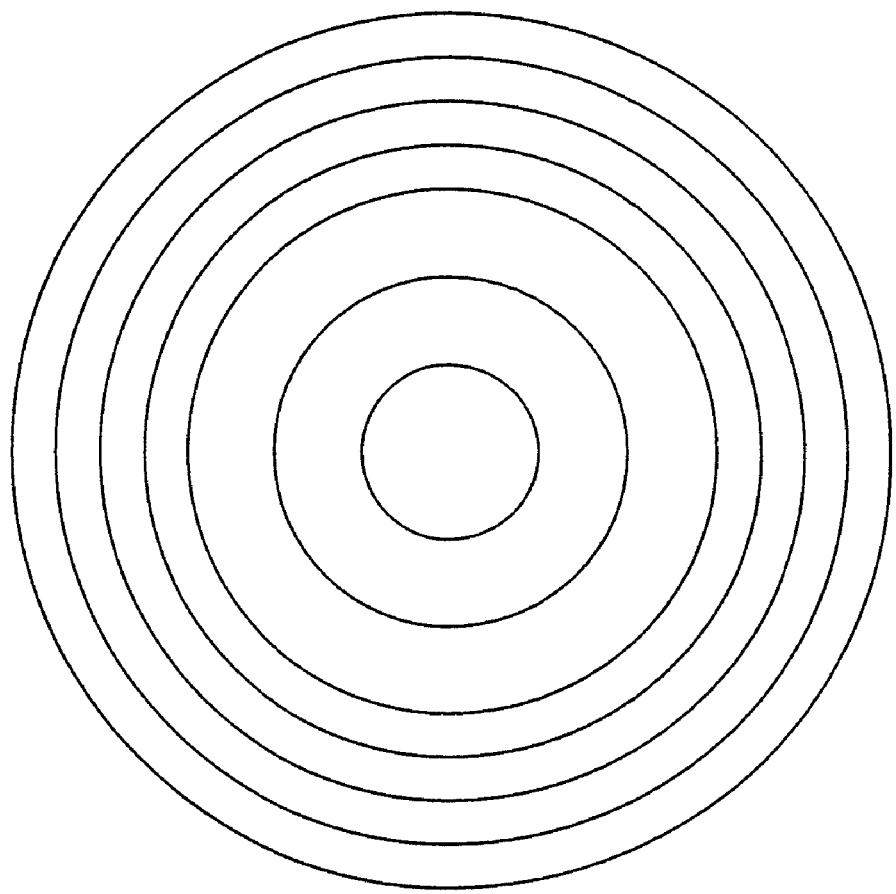
FIG. 10 is a diagram of an electrode pattern of the spherical aberration corrector having the phase-changing layer.

It is also to be noted that, however each of the optical heads described in the first and second embodiments uses a method where a collimator lens is moved and the collimator lens functions as the spherical aberration corrector, there is no problem in that a positive lens group and a negative lens group disclosed in JP 2000-131603 are used as the spherical aberration corrector. Furthermore, there is no problem in employing a method where no lens is used as a spherical aberration corrector. For example, a method using a phase-changing layer disclosed in Japanese Patent Application No. 2001-221927 (JP-A-109776) may be employed. An optical device used in that method is briefly described. FIG. 9 is a sectional view of an optical device which uses a liquid crystal as a phase-changing layer. FIG. 10 is a diagram of an electrode pattern used in this optical device. Referring to FIG. 9, this optical device includes: a first substrate 61; a second substrate 62 which is arranged to be approximately parallel to the first substrate 61; a voltage applying electrode 63 arranged between the first substrate and a liquid crystal 67; an opposing electrode 64 which is arranged to be opposed to the voltage applying electrode and approximately parallel to the voltage applying electrode; a translucent resin film 65 which is formed to cover the voltage applying electrode 63; a translucent resin film 66 which is formed to cover the opposing electrode 64; the liquid crystal 67 which is arranged between the translucent resin films 65 and 66 (between the voltage applying electrode 63 and the opposing electrode 64); and a sealing resin 68 which is arranged between the translucent resin films 65 and 66 so as to surround the liquid crystal 67. The first and second substrates 61 and 62 may be translucent, which may include a glass, for example. The voltage applying electrode 63 is used to apply a desired voltage to the liquid crystal 67. The voltage applying electrode 63 is formed on the inside principal plane of the first substrate 61 (facing the liquid crystal 67). The opposing electrode 64 is used with the voltage applying electrode 63 to apply the desired voltage to the liquid crystal 67. The opposing electrode 64 is formed on the inside principal plane of the second substrate 62 (facing the liquid crystal 67). The opposing electrode 64 is translucent and made from ITO, for example. The opposing electrode 64 is formed approximate uniformly on at least a portion corresponding to the segment of the electrode of the inside principal plane of the second substrate 62. The translucent resin films 65 and 66 are oriented films used to orient the liquid crystal 67 to a predetermined direction and may be made of a polyvinyl alcohol film. It is possible to orient the liquid crystal 67 to the predetermined direction by applying the rubbing process to the translucent resin film 65 or 66. The liquid crystal 67 functions as a phase changing layer which changes the phase of light entered. The liquid crystal 67 may include a nematic liquid crystal, for example. By changing the electrical potential difference between the voltage applying electrode 63 and the opposing electrode 64, it is possible to change a refractive index of the liquid crystal 67, and this changes a phase of the incident light. The sealing resin 68 is used for sealing the liquid crystal 67 and may be made of an epoxy resin, for example. As shown in FIG. 10, the voltage applying electrode 63 may be constituted from concentric segments of electrodes. Those segments of electrodes are translucent and may be made from ITO, for example. Next, the operations of the optical device thus configured will be described.

Control voltages are applied to each of the segments of electrodes of the voltage applying electrode to impart a phase corresponding to a power component to the light entering the optical device of the present invention. This makes possible to convert a plane wave to a spherical wave. When this converted spherical wave enters the objective lens 7, a spherical aberration is imparted to the spherical wave. This imparted spherical aberration corrects another spherical aberration which occurs when the thickness of the optical recording medium 8 deviates from a designed substrate thickness. In this description, however the liquid crystal which changes its refractive index according to a voltage, PLZT (a perovskite structured transmissive crystalline body including lead oxide, lanthanum, zirconium oxide, and titanic oxide) which changes its thickness (volume) according to a voltage may be used. In addition, since the PLZT is a solid substance, unlike the liquid crystal, the sealing resin is not needed. Hence it is possible to reduce the thickness of the optical device.

Since the methodologies described in the first and second embodiments use lenses, it is possible to correct an aberration due to the substrate thickness of the optical recording medium in the returning way as well as in the approaching way. This makes it possible to obtain a well-established control signal. In addition, since the methodologies described use an optical device including a phase-changing layer to correct an aberration due to the substrate thickness of the optical recording medium 8. This methodology has the potential to downsize the optical head. Furthermore, since both methodologies using lenses or using the phase-changing layer correct a spherical aberration using convergent light and divergent light, their performances for correction are not degraded even when the objective lens is shifted.

However, in these embodiments, the reflectance and transmittance of the prism are set to 95% and 5% respectively with respect to the linearly-polarized light which is polarized to the direction of the polarization of the light emitted from the light source 1 so that 95% of light emitted from the light source 1 may travel toward the objective lens 7, it is desirable for the transmittance to be less than or equal to 50% to stably detect an output from the light source 1. In addition, it is desirable for the transmittance to be less than or equal to 20% to stably detect the output from the light source 1 without losing a considerable amount of light which is to travel to the objective lens 7.

In the embodiments described, however the quarter wave plate 6 is used as an n/4 wave plate, any n/4 wave plates can be used so long as n is an odd number.

In the embodiments described, however the objective lens 7 has a single lens composition, the objective lens 7 may be a coupling lens which shows high NA value.

In the embodiments described, however the optical head of an infinite system, an optical head of a finite system which does not uses the collimator lens 4 may be used.

In the embodiments described, however the optical head of a polarization system is described, an optical head of a non-polarization system may be used.

Third Embodiment

In this embodiment, an exemplary optical recording/reproducing apparatus is described. The optical recording/reproducing apparatus according to the third embodiment is an apparatus which records a signal to an optical recording medium 8 and reproduces a signal from the optical recording medium 8 or an apparatus which only reproduces a signal from the optical recording medium 8.

Figure 11:
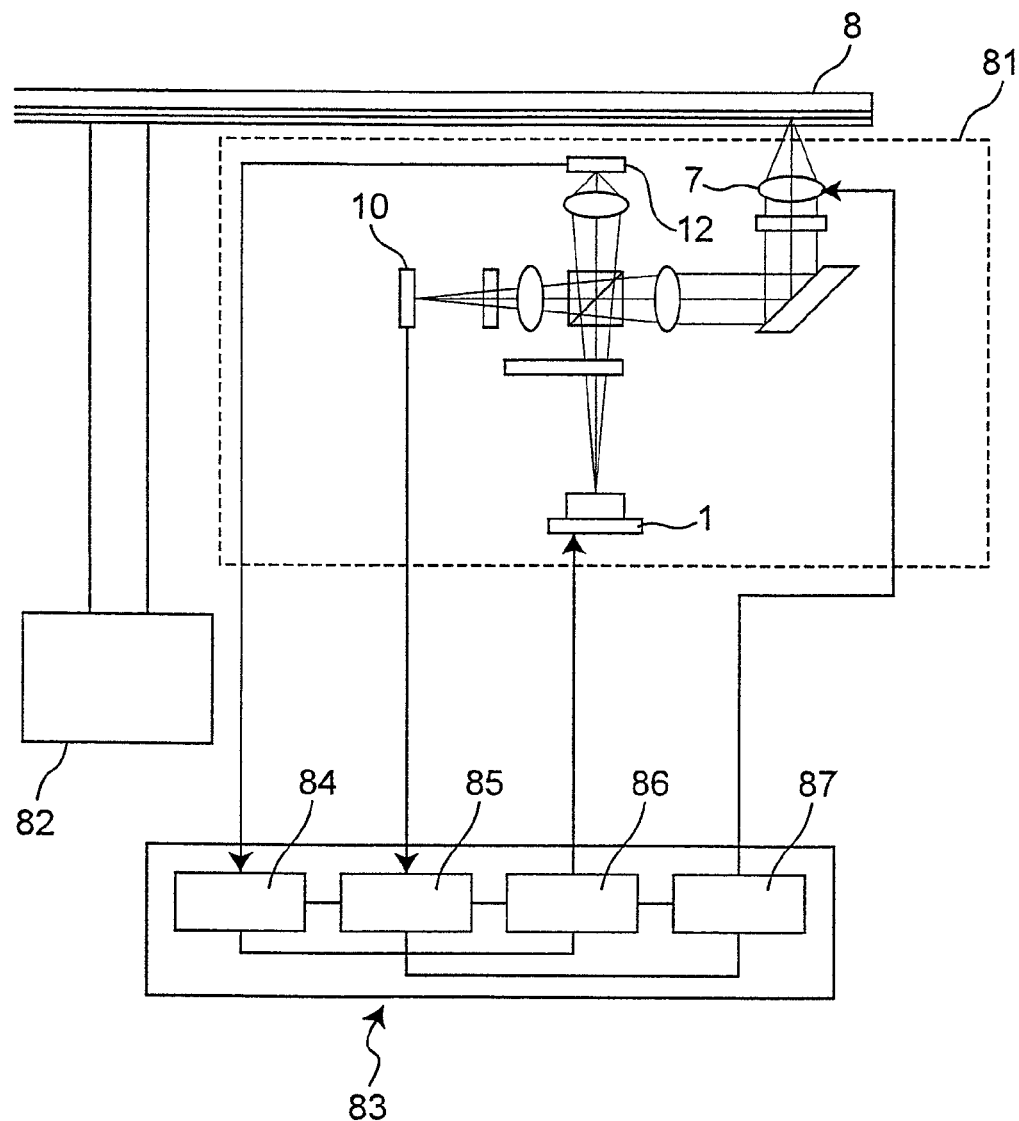
FIG. 11 is a schematic diagram of an example of an optical recording/reproducing apparatus according to the present invention.
Figure 12:
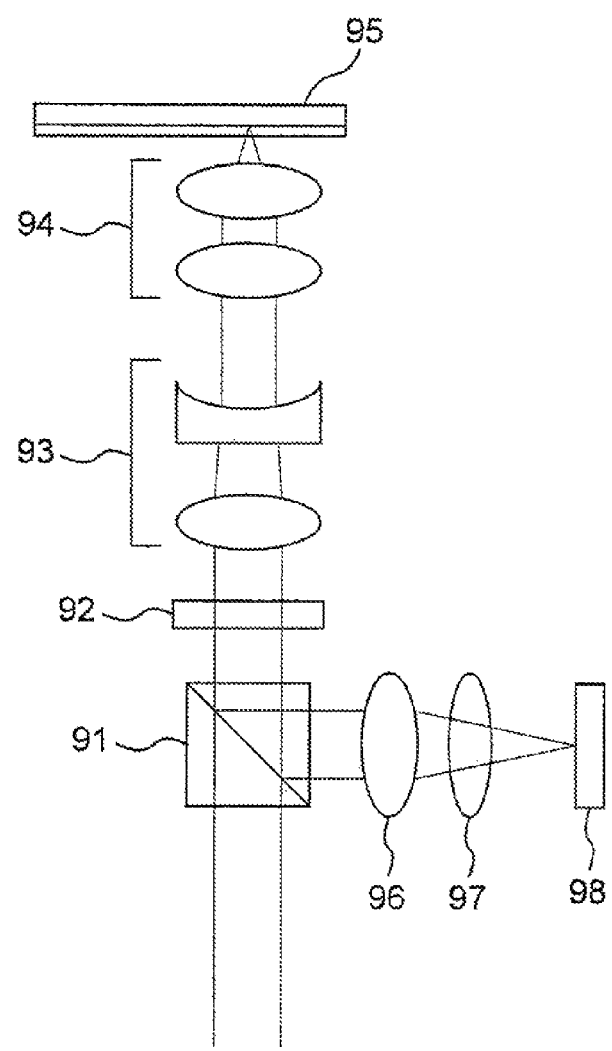
FIG. 12 is a schematic diagram of a conventional optical head.

FIG. 11 is a schematic diagram of a configuration of the optical recording/reproducing apparatus 80 of the third embodiment. The optical recording/reproducing apparatus 80 includes an optical head 81, a motor 82, and a processing circuit 83. The optical head 81 is the same as the one described in the first embodiment. The processing circuit 83 includes: a luminous energy monitoring unit 84; a signal processing unit 85; a luminous energy controlling unit 86; and an objective lens driving unit 87. The units included in the processing circuit 83 are interconnected.

Since the optical head 81 is the same as that described in the first embodiment, a duplicate description is abbreviated.

The operations of the optical recording/reproducing apparatus 80 is described next. At first, when an optical recording medium 8 is loaded, the motor 82 is activated. The luminous energy controlling unit 86 in the processing circuit 83 drives a light source 1 to emit light. The light emitted from the light source 1 reflects on the optical recording medium 8 and then enters a photodetector 10. The photodetector 10 outputs a focus error signal which indicates a condition of focusing of the light on the optical recording medium 8 and a tracking error signal which indicates the position on which the light irradiates to the signal processing unit 85 in the processing circuit 83. The signal processing unit 85, based on these signals, outputs information to be used for controlling an objective lens 7 to the objective lens driving unit 87. The objective lens driving unit 87, based on the information received from the signal processing unit 85, moves the objective lens 7 a predetermined distance along the intended direction so that the light emitted from the light source 1 may be condensed on the desired track of the optical recording medium 8. In addition, the signal processing unit 85, based on the signal output from the photodetector 10, reproduces information recorded on the optical recording medium 8. Furthermore, the signal output from a photodetector for controlling the light source luminous energy 12 is input to the luminous energy monitoring unit 84 in the processing circuit 83, and then the luminous energy monitoring unit 84 sends information according to this signal to the luminous energy controlling unit 86. The luminous energy controlling unit 86 in the processing circuit 83 controls the output power of the light source 1 such that the information may show a desired value. Thus, an amount of the luminous energy emitted from the objective lens 7 can be adjusted to a desired amount.

Since the optical recording/reproducing apparatus 80 of the present embodiment uses the optical head of the first embodiment as an optical head, the light separator is not deteriorated by blue light. Therefore, this optical recording/reproducing apparatus 80 provides us with high reliability and, furthermore, this reliability is not reduced with time.

This invention is not limited to those embodiments and may be embodied in several forms within the spirit of the present invention and the present embodiments are therefore illustrative and not restrictive.

Furthermore, however the present embodiments describe the optical recording medium 8, to which information is recorded using light only, it is to be understood that the present invention is similarly effective with an optical recording medium to which information is recorded using light and magnetism.

Still furthermore, however the present embodiments describe the optical recording medium which is embodied as an optical disc, the present invention can be used with an optical recording medium which is embodied as a card shape optical recording medium, for example. The present invention may be applied to an optical information recording/reproducing apparatus having similar functionality to the present embodiment.

INDUSTRIAL APPLICABILITY

The optical head and the optical recording/reproducing apparatus of the present invention is configured such that the light on its approaching way may not transmit through an adhesive layer of a polarization beam splitter which functions as a light separator in the optical head using a light source of less than or equal to 450 nm wavelength. The present invention is advantageous in that the adhesive layer in the optical head is not deteriorated by light. Hence, this optical head shows high reliability and is useful for high density recording, for example.

The invention claimed is:

1. An optical head for recording and/or reproducing a signal on a multi-layer optical recording medium, the optical head comprising:
    a light source that emits light of less than or equal to 450 nm wavelength;
    an objective lens that condenses light emitted from said light source onto the multi-layer optical recording medium; and
    a light separator that is disposed between said light source and said objective lens on a light path of the emitted light and separates the emitted light from reflected light which is emitted from said light source and reflected by the multi-layer optical recording medium,
    wherein said light separator includes:
    a first glass;
    a multilayer film that is formed on said first glass;
    an adhesive layer that is arranged on said multilayer film;
    a second glass that is fixed on said multilayer film by an adhesive bonding provided by said adhesive layer;
    the emitted light emitted from said light source enters and transmits through said first glass and transmits through said first glass again after a reflection on said multilayer film, in which approximately 90% or more of the emitted light is reflected on the multilayer film, and thereby the emitted light exits said light separator; and
    the reflected light reflected by the multi-layer optical recording medium enters said light separator from a side of said first glass and transmits through said light separator in an order from said first glass, said multilayer film, said adhesive layer, to said second glass.

2. The optical head according to claim 1, wherein the light entering said light separator includes divergent light.

3. An optical head for recording and/or reproducing a signal on a multi-layer optical recording medium, the optical head comprising:
    a light source that emits light of less than or equal to 450 nm wavelength;
    an objective lens that condenses light emitted from said light source onto the multi-layer optical recording medium; and
    a light separator that is disposed between said light source and said objective lens on a light path of the emitted light and separates the emitted light from reflected light which is emitted from said light source and reflected by the multi-layer optical recording medium,
    wherein said light separator includes:
    a first glass;
    a multilayer film that is formed on said first glass;
    an adhesive layer that is arranged on said multilayer film;

a second glass that is fixed on said multilayer film by an adhesive bonding provided by said adhesive layer;

the emitted light emitted from said light source enters and transmits through said first glass and transmits through said first glass again after a reflection on said multilayer film and thereby the emitted light exits said light separator; and the reflected light reflected by the multi-layer optical recording medium enters said light separator from a side of said first glass and transmits through said light separator in an order from said first glass, said multilayer film, said adhesive layer, to said second glass, wherein the optical head further comprises a n/4 wave plate where the n is an odd number greater than or equal to 1 that is disposed between said light source and said objective lens on the light path of the emitted light and converts a polarization direction of the emitted light, wherein: said n/4 wave plate includes a first birefringent member and a second birefringent member;

said first birefringent member and said second birefringent member are arranged such that crystal axes of said first and second birefringent members are seen from the viewpoint right above said members as if the axes cross each other at a right angle; and said first birefringent member and said second birefringent member are bonded each other at least a part of margin of said first birefringent member and said second birefringent member.

4. The optical head according to claim 1, further comprising a spherical aberration corrector that is disposed between said light source and said objective lens on the light path of the emitted light.

5. The optical head according to claim 1, further comprising a connector that integrates said light source and said light separator.

6. The optical head according to claim 1, wherein said multilayer film is formed on said first glass by vapor deposition.

7. The optical head according to claim 1, further comprising an optical device that is disposed between said light source and said objective lens on the light path of the emitted light and converts divergent light to approximate parallel light, wherein said light separator is disposed between said light source and said optical device on the light path of the emitted light.

* * * * *